(12) United States Patent
Ito et al.

(10) Patent No.: US 7,076,948 B2
(45) Date of Patent: Jul. 18, 2006

(54) HYDRAULIC CONTINUOUSLY VARIABLE TRANSMISSION

(75) Inventors: Katsuhiko Ito, Saitama (JP); Shinya Koyama, Saitama (JP); Kazuhiro Yasuda, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 131 days.

(21) Appl. No.: 10/802,398

(22) Filed: Mar. 17, 2004

(65) Prior Publication Data

US 2004/0206078 A1 Oct. 21, 2004

(30) Foreign Application Priority Data

Mar. 31, 2003 (JP) .............................. 2003-096813

(51) Int. Cl.
*F16D 39/00* (2006.01)

(52) U.S. Cl. ............................. 60/486; 60/489; 91/504; 91/506; 92/12.2; 92/57

(58) Field of Classification Search .................. 60/468, 60/487, 489, 494, 486; 91/479, 478, 480, 91/504, 505, 506; 92/12.2, 57, 71
See application file for complete search history.

(56) References Cited

U.S. PATENT DOCUMENTS 4,781,022 A * 11/1988 Hayashi et al. ............... 60/489
4,916,901 A * 4/1990 Hayashi et al. ............... 60/489
5,353,595 A 10/1994 Hayashi et al.
5,575,151 A * 11/1996 Hayashi et al. ............... 60/489
2002/0007633 A1 1/2002 Saito et al.

FOREIGN PATENT DOCUMENTS

| JP | 63140163 | 6/1988 |
|---|---|---|
| JP | 06002753 | 1/1994 |
| JP | 2001141024 | 5/2001 |

* cited by examiner

*Primary Examiner*—Igor Kershteyn
(74) *Attorney, Agent, or Firm*—Carrier, Blackman & Associates, P.C.; William D. Blackman; Joseph P. Carrier (57) ABSTRACT

To reduce the projection of a swash plate servo mechanism in the radial direction, and to make a hydraulic continuously variable transmission compact, a swash plate plunger pump includes a pump casing provided with an input driven gear. A pump cylinder and a motor cylinder are connected to a transmission output shaft, and a motor pivot member provided with a motor swash plate member is supported to be pivotally movable. A motor servo mechanism includes a ball screw shaft, a ball nut to which an end portion of the motor pivot member is connected, and a swash plate control motor to rotate the screw shaft. A swash plate control motor, located on the side of a hydraulic pump relative to the input driven gear, is mounted to the outside surface of a transmission housing close to the center axis side of a transmission output shaft.

13 Claims, 8 Drawing Sheets

HYDRAULIC CONTINUOUSLY VARIABLE TRANSMISSION

CROSS-REFERENCE TO RELATED APPLICATIONS

The present invention claims priority under 35 USC 119 based on Japanese patent application No. 2003-096813, filed Mar. 31, 2003.

BACKGROUND OF THE INVENTION

1. Field of the Invention

The present invention relates to a hydraulic continuously variable transmission. More particularly, the present invention relates to a hydraulic continuously variable transmission including a swash plate plunger pump and a swash plate plunger motor connected to each other through a closed hydraulic circuit, and particularly to a hydraulic continuously variable transmission including a swash plate servo device for pivotally adjusting a swash plate member of a swash plate plunger motor.

2. Description of the Background Art

As to hydraulic continuously variable transmissions including a hydraulic pump and a hydraulic motor in combination, a variety of forms of configurations have been known and put to practical use.

One example of a commercial hydraulic continuously variable transmission was sold by Honda and marketed under the trademark "Hondamatic" on the 2001 Honda Fourtrax Foreman Rubicon™ TRX500 ATV.

Another example of a known hydraulic continuously variable transmission is disclosed in Japanese Patent Laid-open No. Hei 6-2753 and Japanese Patent Publication No. Hei 7-88884 proposed by the present applicant. The hydraulic continuously variable transmission disclosed in these patent documents includes a swash plate plunger pump, a swash plate plunger motor, and a closed hydraulic circuit for connecting a discharge port and a suction port of the swash plate plunger pump to a suction port and a discharge port of the swash plate plunger motor, wherein a pump swash plate member is driven by an engine, a pump cylinder and a motor cylinder are connected to each other and disposed in a connected state on an output shaft, a motor swash plate is restricted in rotation, and the motor swash plate angle can be regulated variably.

Thus, in order to variably regulating the motor swash plate angle, hitherto, a configuration has been adopted in which an arm portion formed by projecting an outer circumferential portion portion of the motor swash plate (motor pivoting member) in a radial direction is moved in the axial direction by a swash plate servo device to thereby pivotally move the motor swash plate. Such a swash plate servo device is disclosed, for example, in Japanese Patent Laid-open No. 2001-141024. The swash plate servo device includes a screw shaft extending in parallel to the rotational axis of an output shaft and rotatably supported on the transmission housing, a nut member which is screw-engaged with the screw shaft and to which the tip end of the arm portion is connected, and a servo motor for driving the screw shaft to rotate, and the swash plate servo device is disposed on a lateral side of and in a side-by-side relationship with the hydraulic pump and motor constituting the hydraulic continuously variable transmission.

However, since the swash plate servo device is disposed on a lateral side of and in a side-by-side relationship with the hydraulic pump and motor as above-mentioned, an attachment portion of the servo motor projects to a lateral side, whereby the size of the transmission in a side direction (a direction perpendicular to the axis) is enlarged, and the transmission is enlarged in size.

Particularly, in the case of the above-mentioned hydraulic continuously variable transmission, an input gear (primary driven gear) for receiving the rotational drive force from the engine is attached to the outer circumference of a pump casing of the hydraulic pump, and the input gear projects outwards in the radial direction, resulting in the problem that the swash plate servo device is liable to project more in a side direction so as to obviate interference with the input gear.

In addition, since the servo motor composed of an electric motor is disposed in the vicinity of a lateral side of the swash plate plunger pump and motor, the electric pump is liable to be affected by any heat coming from the side of the pump and motor.

Although the known devices have some utility for their intended purposes, there is still a need to provide an improved hydraulic continuously variable transmission.

More particularly, there is a need for an improved hydraulic continuously variable transmission including a swash plate plunger pump and a swash plate plunger motor connected to each other through a closed hydraulic circuit, and particularly to a hydraulic continuously variable transmission including a swash plate servo device for pivotally adjusting a swash plate member of a swash plate plunger motor.

SUMMARY OF THE INVENTION

The present invention has been made in consideration of the above problems. Accordingly, it is an object of the present invention to provide a hydraulic continuously variable transmission in which the amount of projection in a radial direction of a swash plate servo device for pivotally adjusting a motor swash plate can be reduced and which is compact with a small width.

It is another object of the present invention to provide a hydraulic continuously variable transmission so configured that a servo motor (swash plate control motor) constituting a swash plate servo device is less liable to be affected by heat coming from the side of a pump and a motor.

In order to attain the above objects, according to an illustrative embodiment of the present invention, a hydraulic continuously variable transmission is provided, including a swash plate plunger pump and a swash plate plunger motor connected to each other through a closed hydraulic circuit, with an input gear (for example, an input driven gear in the embodiment) provided at the outer circumference of the swash plate plunger pump.

The hydraulic continuously variable transmission also includes a pivotally movable swash plate (for example, a motor swash plate member and a motor pivot member in the embodiment), selected from the swash plate plunger pump or the swash plate plunger motor. The movable swash plate is supported to be pivotally movable about a pivot axis extending in a direction perpendicular to the rotational center axis of the input gear.

The hydraulic continuously variable transmission also includes a swash plate adjustment mechanism for pivotally adjusting the movable swash plate, and a servo motor for driving the swash plate adjustment mechanism. Furthermore, an output shaft of the servo motor is disposed in parallel to the rotational center axis of the input gear, and the servo motor overlaps partly with the input gear in side view.

According to the hydraulic continuously variable transmission constituted as above, since the servo motor and the input gear are disposed close to each other to such an extent that they overlap partly with each other in side view, the amount of projection of the swash plate adjustment mechanism in a radial direction can be reduced, and a compact hydraulic continuously variable transmission with a small width can be obtained.

In addition, it is preferable that the swash plate adjustment mechanism and a rotatable drive shaft of the servo motor are connected to each other through a spacer shaft which is parallel to the rotational center axis of the input gear and extends through the vicinity of an outer circumferential portion of the input gear.

With such a configuration, in which the rotation of the servo motor is transmitted to a screw shaft through the spacer shaft, the spacer shaft smallest in radial size can be so disposed as to pass through the vicinity of the outer circumferential portion of the input gear, the servo motor can be set closest to the output shaft side, and the hydraulic continuously variable transmission can be made most compact in width.

Furthermore, by connecting the servo motor to the swash plate adjustment mechanism through the spacer shaft, it is possible to dispose the servo motor axially away from a lateral side of the pump and motor, and to ensure that the servo motor is less liable to be affected by any heat coming from the side of the pump and motor.

In addition, it is preferable that the rotation of the spacer shaft is transmitted to the swash plate adjustment mechanism through an idle gear train. This makes it possible, for example, to arbitrarily set the position of the swash plate adjustment mechanism (the screw shaft in the embodiment) and the position of the servo motor, and to increase the degree of freedom in arrangement layout. Furthermore, it is possible to freely set the rotating speed ratio of the swash plate adjustment mechanism (screw shaft) relative to the rotation of the servo motor, i.e., transmission ratio, by changing the gear ratios in the idle gear train.

For a more complete understanding of the present invention, the reader is referred to the following detailed description section, which should be read in conjunction with the accompanying drawings. Throughout the following detailed description and in the drawings, like numbers refer to like parts.

DETAILED DESCRIPTION

Figure 2:
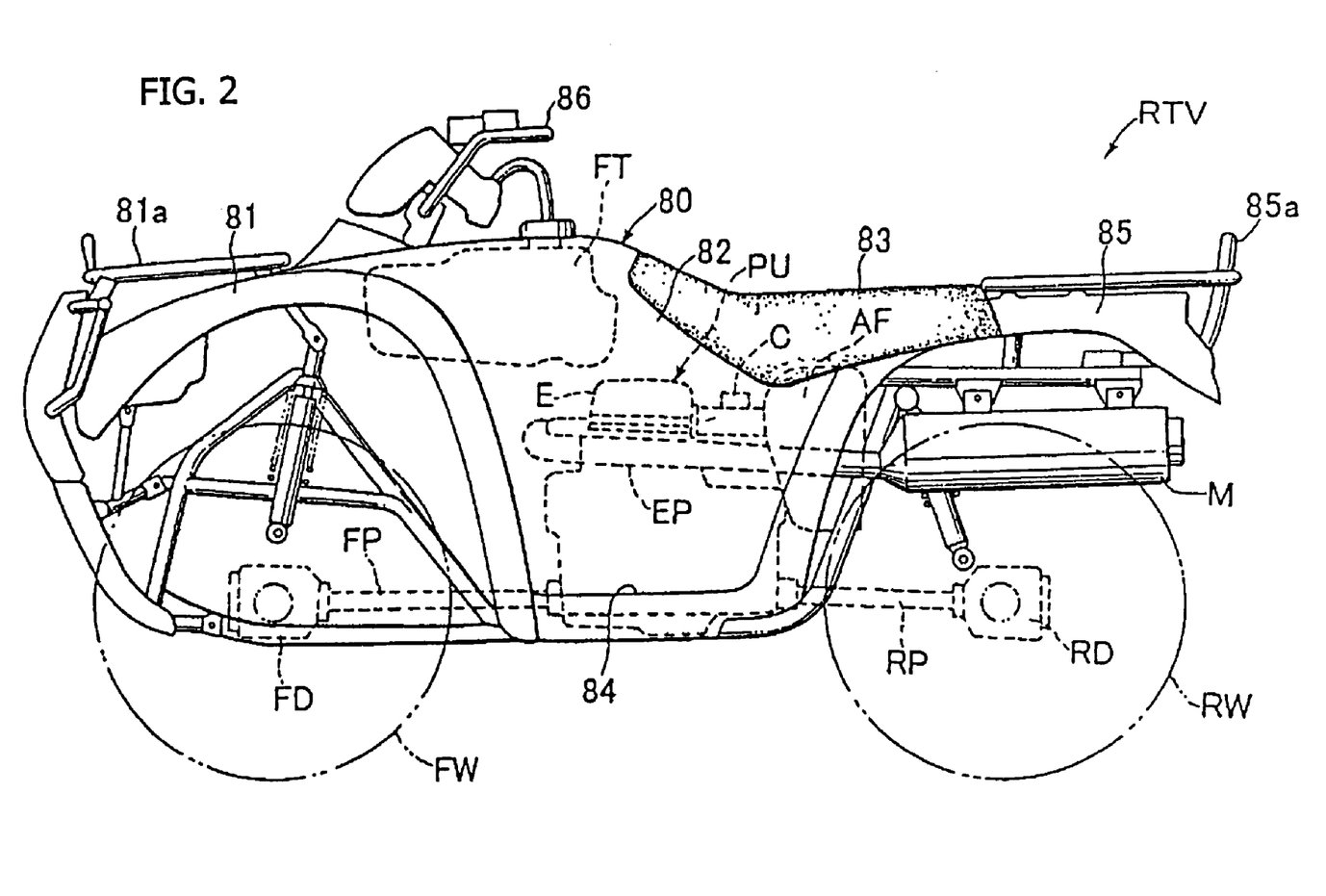
FIG. 2 is a side elevational view of a rough terrain vehicle including the above hydraulic continuously variable transmission according to an embodiment of the present invention.
Figure 3:
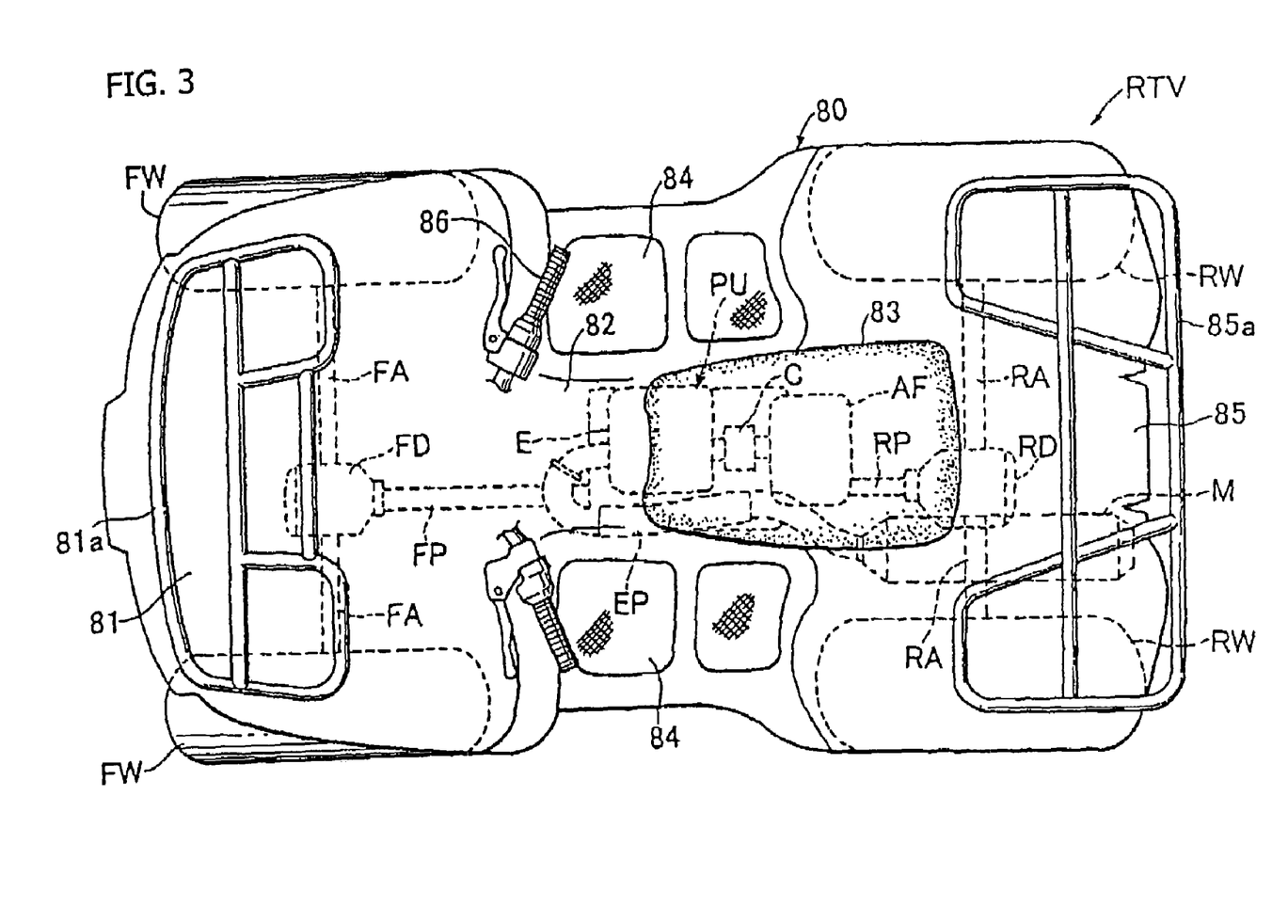
FIG. 3 is a top plan view of the rough terrain vehicle including the hydraulic continuously variable transmission according to an embodiment of the present invention.
Figure 4:
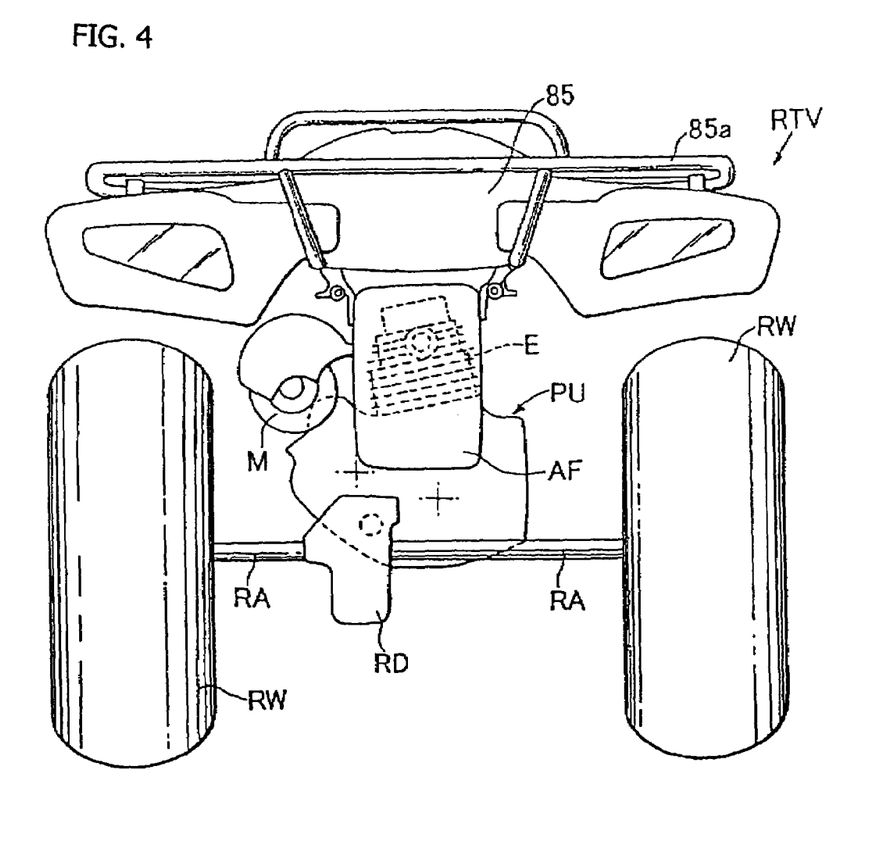
FIG. 4 is a back elevation of the rough terrain vehicle including the hydraulic continuously variable transmission according to an embodiment of the present invention.

Now, an embodiment of the present invention will be described below referring to the drawings. First, FIGS. 2 to 4 show a rough terrain vehicle RTV including a hydraulic continuously variable transmission according to the present invention. The vehicle RTV includes a power unit PU incorporated in a vehicle body 80 having a frame structure therein, and left and right front and rear wheels FW and RW driven upon receiving the output of the power unit PU.

In addition, the vehicle body 80 includes a front fender portion 81 including a front guard 81a and located at a vehicle body front portion, a saddle portion 82 raised upwards and extending in the front-rear direction at a vehicle body central portion, left and right step portions 84, 84 extending in the left-right direction at left and right lower portions of the saddle portion 82, and a rear fender portion 85 including a rear guard 85a and located at a vehicle body rear portion, and the saddle portion 82 is provided with a seat 83 for seating a driver thereon.

Figure 1:
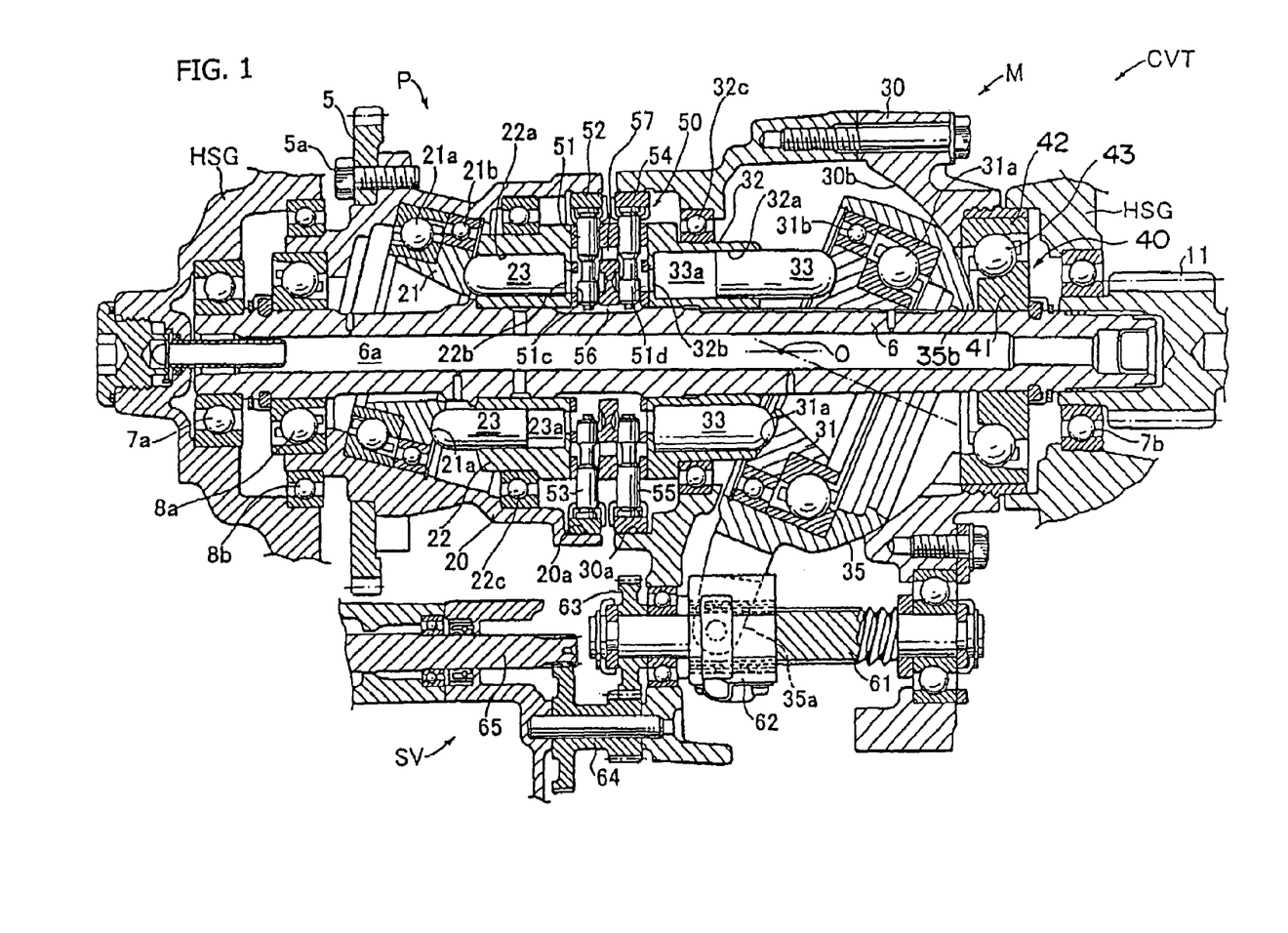
FIG. 1 is a sectional view of a hydraulic continuously variable transmission according to an embodiment of the present invention.

The driver thus seated on the seat 83 astride the saddle portion 82 puts his/her feet on the left and right step portions 84, and pivotally turns a steering handle 86 located on the front side and being pivotable to the left and right sides. In addition, a fuel tank FT is disposed on the front side of the saddle portion 82, as shown in FIG. 1.

The power unit PU is disposed in the inside of the saddle portion 82, and the power unit PU includes an engine E, a main clutch CL, a hydraulic continuously variable transmission CVT, and a transmission gear train GT, as will be described later. The engine E is so constituted that a mixture gas formed by mixing air taken in through an air filter AF and a fuel fed from the fuel tank FT with each other in a carburetor C is taken into a cylinder and is combusted in the cylinder to thereby generate a rotational drive force. In addition, an exhaust gas discharged upon the combustion in the engine E is discharged through an exhaust pipe EP and a muffler M.

The rotational drive force of the engine E is transmitted from a crankshaft with a speed change through the main clutch CL, the hydraulic continuously variable transmission CVT and the transmission gear train GT, and is outputted to front and rear propeller shafts FP and RP.

The front propeller shaft FP is connected to a front differential mechanism FD, and the rotational drive force outputted to the front propeller shaft FP is transmitted from the front differential mechanism FD to the left and right front wheels FW through left and right front axle shafts FA, to drive the front wheels FW. The rear propeller shaft RP is connected to a rear differential mechanism RD, and the rotational drive force outputted to the rear propeller shaft RP is transmitted from the rear differential mechanism RD to the left and right rear wheels RW through left and right rear axle shafts RA, to drive the rear wheels RW.

Figure 5:
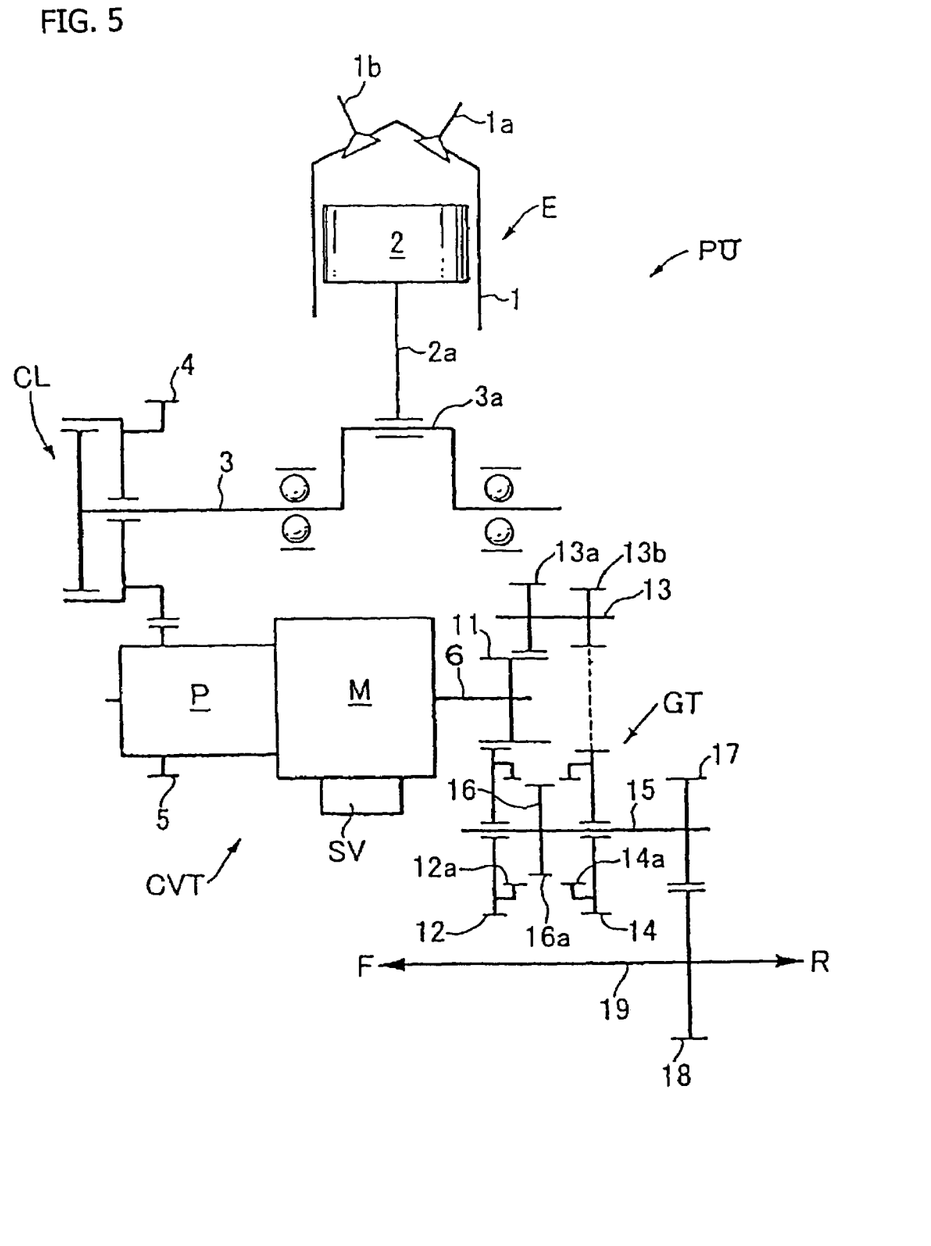
FIG. 5 is a schematic diagram showing the constitution of power transmission paths in a power unit including the hydraulic continuously variable transmission according to an embodiment of the present invention.

The power unit PU will be described referring to FIG. 5. The power unit PU includes the engine E for generating the rotational drive force, the main clutch CL for controlling the transmission of the rotational drive force, the hydraulic continuously variable transmission CVT for stepless speed change of the rotational drive force transmitted through the main clutch CL, and the transmission gear train GT for direction changeover and transmission of the output rotation of the hydraulic continuously variable transmission CVT. In addition, the power unit PU is disposed in the inside of the saddle portion 82, with the engine crankshaft extending in the front-rear direction of the vehicle.

The engine E includes a piston 2 disposed in a cylinder 1 provided with intake and exhaust valves 1a and 1b in a head portion thereof. In the engine E, as mentioned above, air taken in through the air filter AF and the fuel fed from the fuel tank FT are mixed with each other in the carburetor C to form the mixture gas, which is sucked into a cylinder chamber by opening the intake valve 1a at a predetermined timing, and is combusted in the cylinder chamber to thereby reciprocate the piston 2, and the reciprocating motion of the piston 2 is transmitted through a connecting rod 2a to a crank portion 3a, whereby a crankshaft 3 is driven to rotate.

The main clutch CL is provided at an end portion of the crankshaft 3, to control the engagement and disengagement between an input drive gear 4 rotatably disposed on the crankshaft 3 and the crankshaft 3. Therefore, the rotational drive force of the crankshaft 3 is transmitted to the input drive gear 4 according to the engagement/disengagement control by the main clutch CL. In addition, the main clutch CL is composed, for example, of a centrifugal clutch.

The hydraulic continuously variable transmission CVT includes a swash plate plunger type hydraulic pump P and a swash plate plunger type hydraulic motor M. An input driven gear 5 connected to a pump casing constituting the swash plate plunger type hydraulic pump P is meshed with the input drive gear 4, and the rotational drive force of the engine E is transmitted to the input driven gear 5, whereby the pump casing is driven to rotate. While details of the hydraulic continuously variable transmission CVT will be described later, the output rotation obtained through stepless speed change by the hydraulic continuously variable transmission CVT is outputted to a transmission output shaft 6.

A transmission output gear 11 constituting the transmission gear train GT is connected to the transmission output shaft 6, and the rotation of the transmission output shaft 6 is transmitted from the transmission output gear 11 through the transmission gear train GT. The transmission gear train GT includes a counter shaft 15 and an idler shaft 13 which are disposed in parallel to the transmission output shaft 6. On the counter shaft 15, a forward-running gear 12 and a rearward-running gear 14 are rotatably disposed, and an output drive gear 17 is disposed in a connected state. On the other hand, a first idler gear 13a and a second idler gear 13b are disposed in a connected state on the idler shaft 13. The forward-running gear 12 is meshed with the transmission output gear 11, and the first idler gear 13a is also meshed with the transmission output gear 11. In addition, the second idler gear 13b is meshed with the rearward-running gear 14.

The forward-running gear 12 and the rearward-running gear 14 are provided respectively with internal clutch gears 12a and 14a, and a clutch sleeve 16 rotatable as one body with the counter shaft 15 and movable in the axial direction is provided between the forward-running gear 12 and the rearward-running gear 14. The clutch sleeve 16 is provided with an external clutch gear 16a at the outer circumference thereof, and is so structured that the clutch sleeve 16 can be moved in the axial direction to selectively mesh with the internal clutch gears 12a and 14a, whereby a dog tooth clutch is constituted. In addition, the clutch sleeve 16 is moved in the axial direction according to shift lever operations to the forward running side and the rearward running side by the driver.

When a shift lever operation to the forward running side is performed by the driver, the clutch sleeve 16 is moved leftwards in the figure, the external clutch gear 16a is meshed with the internal clutch gear 12a, and the forward-running gear 12 is connected to the counter shaft 15. In this condition, therefore, the rotation of the transmission output gear 11 is transmitted from the forward-running gear 12 to the counter shaft 15, whereby the output drive gear 17 is driven to rotate.

On the other hand, when a shift lever operation to the rearward running side is performed by the driver, the clutch sleeve 16 is moved rightwards in the figure, the external clutch gear 16a is meshed with the internal clutch gear 14a, and the rearward-running gear 14 is connected to the counter shaft 15. In this condition, the rotation of the transmission output gear 11 is transmitted from the first idler gear 13a to the second idler gear 13b through the idler shaft 13, and is further transmitted from the second idler gear 13b to the counter shaft 15 through the rearward-running gear 14 meshed with the second idler gear 13b, whereby the output drive gear 17 is driven to rotate. In addition, the rotating direction of the output drive gear 17 in this instance is in the reverse direction (rearward-running direction) relative to that in the case of the shift lever operation to the forward running side.

The output drive gear 17 is meshed with an output driven gear 18 connected and attached to a drive shaft 19, so that the rotation of the output drive gear 17 is transmitted to the drive shaft 19 through the output driven gear 18. The front end of the drive shaft 19 is connected to the front propeller shaft FP, while the rear end of the drive shaft 19 is connected to the rear propeller shaft RP, and the rotational drive force transmitted to the drive shaft 19 is transmitted to the front and rear propeller shafts FP and RP, whereby the front and rear wheels FW and RW are driven, as mentioned above.

Next, the hydraulic continuously variable transmission CVT will be described referring to FIG. 1 and FIGS. 6 to 8. The hydraulic continuously variable transmission CVT includes the swash plate plunger type hydraulic pump P and the swash plate plunger type hydraulic motor M, with the transmission output shaft 6 disposed to extend through the center thereof. In addition, the transmission output shaft 6 is supported by ball bearings 7a and 7b to be rotatable relative to a transmission housing HSG.

The hydraulic pump P includes a pump casing 20 disposed on the transmission output shaft 6 to be coaxial with and rotatable relative to the transmission output shaft 6, a pump swash plate member 21 disposed in the inside of the pump casing 20 in the state of being inclined at a predetermined angle to the rotational center axis of the pump casing 20, a pump cylinder 22 disposed opposite to the pump swash plate member 21, and a plurality of pump plungers 23 slidably disposed in a plurality of pump plunger holes 22a formed to extend in the axial direction in an annular layout surrounding the center axis of the pump cylinder 22. The pump casing 20 is rotatably supported on the transmission output shaft 6 through a bearing 8a, and is supported by a bearing 8b to be rotatable relative to the transmission housing HSG. The pump swash plate member 21 is supported by bearings 21a and 21b to be rotatable about an axis inclined at the predetermined angle relative to the pump casing 20. The pump cylinder 22 is supported by a bearing 22c to be coaxial with and rotatable relative to the pump casing 20.

The input driven gear 5 is attached to the outer circumference of the pump casing 20 in the state of being fastened by bolts 5a. In addition, an outside end portion of each of the plungers 23 projects outwards to make contact and engagement with a swash plate surface 21a of the pump swash plate member 21, and an inside end portion thereof located in the pump plunger hole 22a is opposed to a valve body 51 in a distribution valve 50 which will be described later, thereby forming a pump oil chamber 23a in the pump plunger hole 22a. In addition, pump openings 22b functioning as pump discharge and suction ports are provided at end portions of the pump plunger holes 22a. When the input driven gear 5 is driven to rotate as above-mentioned, the pump casing 20 is driven to rotate, the pump swash plate member 21 disposed in the inside of the pump casing 20 is oscillated by the rotation of the pump casing 20, and the pump plungers 23 are reciprocated in the pump plunger holes 22a according to the oscillating movement of the swash plate surface 21a, to alternately apply compressive and expansive forces to hydraulic fluid in the inside of the pump oil chambers 23a.

The hydraulic motor M includes a motor casing 30 connected to and firmly held on the transmission housing HSG, a motor pivot member 35 which is supported through sliding contact with a concave hemispherical support socket 30b formed on the inside surface of the motor casing 30 and is supported to be pivotable about an pivot axis O extending in a perpendicular direction (in the direction perpendicular to the paper surface) relative to the center axis of the transmission output shaft 6, a motor swash plate member 31 rotatably supported inside the motor pivot member 35 by bearings 31a and 31b, and a plurality of motor plungers 33 slidably disposed in a plurality of motor plunger holes 32a formed to extend in the axial direction in an annular layout surrounding the center axis of the motor cylinder 32. In addition, the motor cylinder 32 is rotatably supported, at an outer circumferential portion thereof, on the motor casing 30 through a bearing 32c.

An outside end portion of each of the motor plungers 33 projects outwards to make contact and engagement with a swash plate surface 31a of the motor swash plate member 31, and an inside end portion thereof located in the plunger hole 32a is opposed to the valve body 51, thereby forming a motor oil chamber 33a in the motor plunger hole 32a. In addition, motor openings 32b functioning as motor discharge and suction ports are formed at end portions of the motor plunger holes 32a. An arm portion 35a formed by projecting an end portion of the motor pivot member 35 toward the outer diameter side projects radially outwards to be connected to a motor servo mechanism SV, a control for moving the arm portion 35a in the left-right direction in the figure is performed by the motor servo mechanism SV, and a control for pivoting the motor pivot member 35 about the pivot axis O is performed. When the motor pivot member 35 is thus pivoted, the motor swash plate member 31 rotatably supported inside the motor pivot member 35 is also pivoted together, with the result of a change in the swash plate angle.

The distribution valve 50 is disposed between the pump cylinder 22 and the motor cylinder 32. The valve body 51 of the distribution valve 50 is clamped between the pump cylinder 22 and the motor cylinder 32 to achieve integral connection, and is also connected to the transmission output shaft 6. Therefore, the pump cylinder 22, the distribution valve 50, the motor cylinder 32, and the transmission output shaft 6 are rotated as one body.

Figure 7:
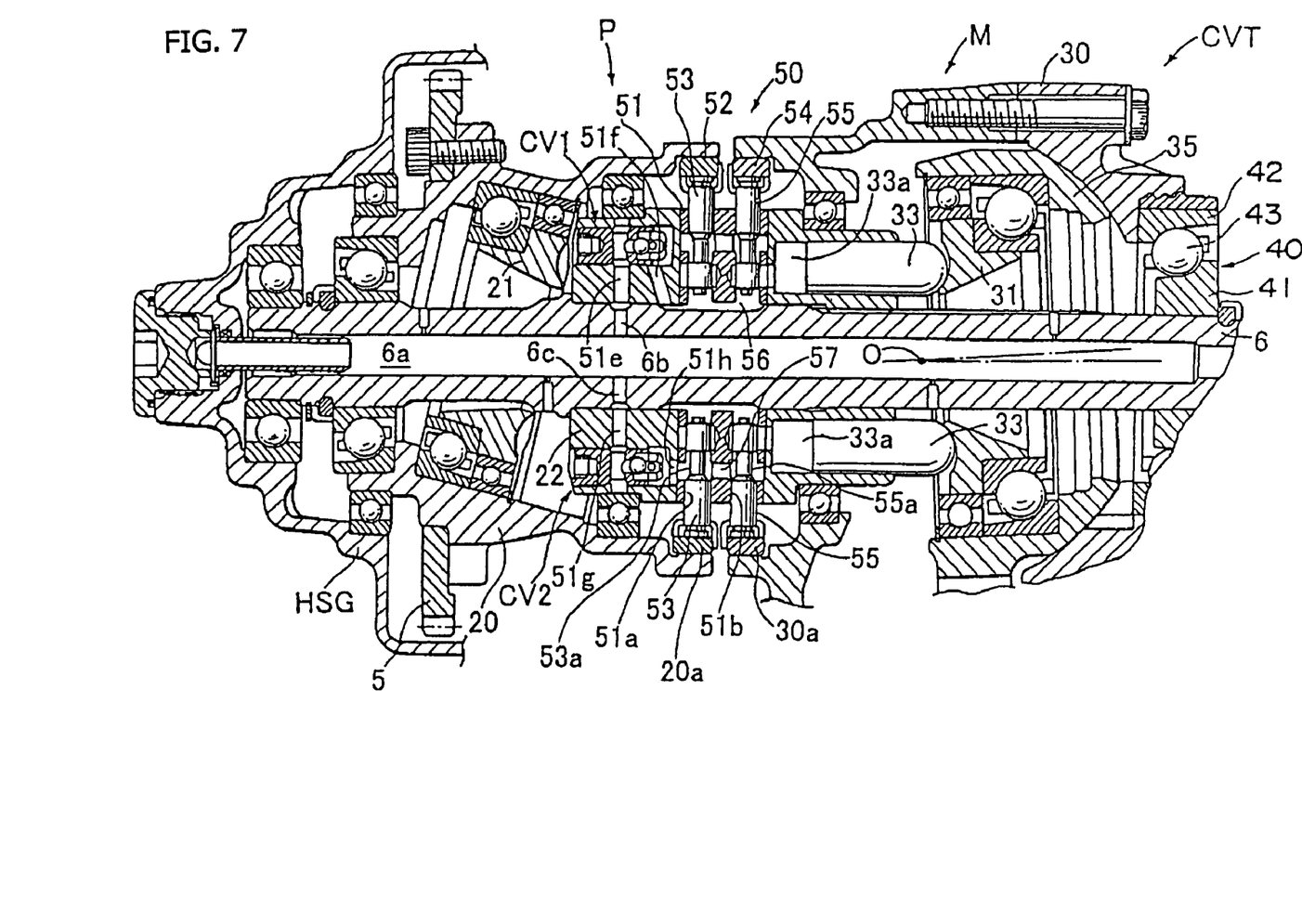
FIG. 7 is a sectional view of the hydraulic continuously variable transmission according to an embodiment of the present invention.

As symbols clearly shown particularly in FIG. 7, a plurality of pump-side spool holes 51a and a plurality of motor-side spool holes 51b extending in the radial directions and laid out at regular intervals along the circumferential direction are provided, in two rows, in the valve body 51 constituting the distribution valve 50. Pump-side spools 53 are slidably disposed in the pump-side spool holes 51a, and motor-side spools 55 are slidably disposed in the motor-side spool holes 51b.

The pump-side spool holes 51a are formed in correspondence with the pump plunger holes 22a, and the valve body 51 is provided with a plurality of pump-side communication passages 51c for communication between the corresponding pairs of the pump openings 22b (the pump oil chambers 23a) and the pump-side spool holes 51a. The motor-side spool holes 51b are formed in correspondence with the motor plunger holes 32a, and the valve body 51 is provided with a plurality of motor-side communication passages 51d for communication between the corresponding pairs of the motor openings 32b (the motor oil chambers 33a) and the motor-side spool holes 51b (see FIG. 1).

In the distribution valve 50, further, a pump-side cam ring 52 is disposed at a position surrounding the outer circumferential portion portions of the pump-side spools 53, and a motor-side cam ring 54 is disposed at a position surrounding the outer circumferential portion of the motor-side spools 55. The pump-side cam ring 52 is mounted inside an eccentric inner circumferential surface 20a formed on the tip end inside surface of the pump casing 20 with an eccentricity from the rotational center axis of the pump casing 20, and is rotated as one body with the pump casing 20. The motor-side cam ring 54 is mounted inside an eccentric inner circumferential surface 30a formed on the tip end inside surface of the motor casing 30 with an eccentricity from the rotational center axis of the motor cylinder 32. In addition, the outer circumferential portions of the pump-side spools 53 are relatively rotatably engaged and stopped on the inner circumferential surface of the pump-side cam ring 52, and the outer circumferential portions of the motor-side spools 55 are relatively rotatably engaged and stopped on the inner circumferential surface of the motor-side cam ring 54.

An inside passage 56 is formed between the inner circumferential surface of the valve body 51 and the outer circumferential surface of the transmission output shaft 6, and inner circumferential end portions of the pump-side spool holes 51a and the motor-side spool holes 51b are communicated with the inside passage 56. In addition, the valve body 51 is provided therein with an outside passage 57 for communication between the pump-side spool holes 51a and the motor-side spool holes 51b.

Here, the operations of the distribution valve 50 constituted as above will be described. When the drive force of the engine E is transmitted to the input driven gear 5 and the pump casing 20 is driven to rotate, the pump swash plate member 21 is oscillated according to the rotation. Therefore, the pump plungers 23 in contact and engagement with the swash plate surface 21a of the pump swash plate member 21 are reciprocated in the axial direction in the pump plunger holes 22a, the hydraulic fluid is discharged from the pump oil chambers 23a through the pump openings 22b according to the inward movements of the pump plungers 23, and the hydraulic fluid is sucked into the pump chambers 23a through the pump openings 22b according to the outward movements of the pump plungers 23.

In this instance, the pump-side cam ring 52 attached to an end portion of the pump casing 20 is rotated together with the pump casing 20, and, since the pump-side cam ring 52 is mounted with an eccentricity relative to the rotational center of the pump casing 20, the pump-side spools 53 are reciprocated in the radial direction inside the pump-side spool holes 51a according to the rotation of the pump-side cam ring 52. In the reciprocation of the pump-side spools 53, when the pump-side spool 53 is moved toward the inner diameter side as shown in the upper half of FIG. 1, the pump-side communication passage 51c and the outside passage 57 are communicated with each other through a spool groove 53a; on the other hand, when the pump-side spool 53 is moved toward the outer diameter side as shown in the lower half of FIG. 1, the pump-side passage 51c and the inside passage 56 are communicated with each other through the spool groove 53a.

Here, the eccentric mount position is so set that, when the swash plate member 21 is oscillated by the rotation of the pump casing 20, and the pump plungers 23 are thereby reciprocated, in a half rotation of the pump casing 20 in which the pump plunger 23 is moved from a most pushed-outward position (referred to as the bottom dead center) to a most pushed-inward position (referred to as the top dead center), the pump-side cam ring 52 moves the pump-side spool 53 toward the inner diameter side, and, in a half rotation of the pump casing 20 in which the pump plunger 23 is moved from the top dead center to the bottom dead center, the pump-side cam ring 52 moves the pump-side spool 53 toward the outer diameter side.

As a result, when the pump plunger 23 is moved from the bottom dead center to the top dead center attendant on the rotation of the pump casing 20 and the hydraulic fluid in the pump oil chamber 23a is thereby discharged through the pump opening 22b, the hydraulic fluid is fed out through the pump-side communication passage 51c into the outside passage 57. On the other hand, when the pump plunger 23 is moved from the top dead center to the bottom dead center attendant on the rotation of the pump casing 20, the hydraulic fluid in the inside passage 56 is sucked into the pump oil chamber 23a through the pump-side communication passage 51c and the pump opening 22b. As seen from this, when the pump casing 20 is driven to rotate, the hydraulic fluid discharged from the hydraulic pump P is supplied into the outside passage 57, and the hydraulic fluid is sucked from the inside passage 56 into the hydraulic pump P.

On the other hand, the motor-side cam ring 54 attached to an end portion of the motor casing 30 is also mounted with an eccentricity relative to the rotational center of the motor casing 30, so that, when the motor cylinder 32 is rotated, the motor-side spools 55 are reciprocated in the radial direction inside the motor-side spool holes 51b according to the rotation. In the reciprocation of the motor-side spools 55, when the motor-side spool 55 is moved toward the inner diameter side as shown in the upper half of FIG. 1, the motor-side communication passage 51d and the outside passage 57 are communicated with each other through a spool groove 55a; on the other hand, when the motor-side spool 55 is moved toward the outer diameter side as shown in the lower half of FIG. 1, the motor-side passage 51d and the inside passage 56 are communicated with each other through a spool groove 55a.

Here, as has been described above, the hydraulic fluid discharged from the hydraulic pump P is fed into the outside passage 57, and the hydraulic fluid is supplied from the motor-side communication passage 51d into the motor oil chambers 33a through the motor openings 32b, whereby the motor plungers 33 are pushed outwards in the axial direction. Outside end portions of the motor plungers 33 thus receiving the axially outward pushing forces are in sliding contact with the portion ranging from the top dead center to the bottom dead center of the motor swash plate member 31 in the condition where the motor pivot member 35 is pivoted as shown in FIG. 1, and the motor cylinder 32 is driven to rotate so that the motor plungers 33 are each moved along the motor swash plate member 31 from the top dead center to the bottom dead center by the axially outward pushing force.

In order to achieve such a rotational driving, the eccentric mount position of the motor-side cam ring 54 is so set that, when the motor plungers 33 are each reciprocated along the inclination of the motor swash plate member 31 attendant on the rotation of the motor cylinder 32, in a half rotation of the motor cylinder 32 in which the motor plunger 33 is moved from a most pushed-outward position (bottom dead center) to a most pushed-inward position (top dead center), the motor-side cam ring 54 moves the motor-side spool 55 toward the outer diameter side, and, in a half rotation of the motor cylinder 32 in which the motor plunger 33 is moved from the top dead center to the bottom dead center, the motor-side cam ring 54 moves the motor-side spool 55 toward the outer diameter side.

When the motor cylinder 32 is thus driven to rotate, the motor plunger 33 is pushed and moved inwards when moving along the motor swash plate member 31 from the bottom dead center to the top dead center, whereby the hydraulic fluid in the motor oil chamber 33a is fed from the motor opening 32b into the inside passage 56 through the motor-side communication passage 51d. The hydraulic fluid thus fed into the inside passage 56 is sucked into the pump oil chamber 23a through the pump-side communication passage 51c and the pump opening 22b.

As is seen from the above description, when the pump casing 20 is driven to rotate by receiving the rotational drive force of the engine E, the hydraulic fluid is discharged from the hydraulic pump P into the outside passage 57, and is fed to the hydraulic motor M, to drive the motor cylinder 32 to rotate. The hydraulic fluid having driven the motor cylinder 32 to rotate is fed into the inside passage 56, and is sucked from the inside passage 56 into the hydraulic pump P. Thus, the closed hydraulic circuit for connecting the hydraulic pump P and the hydraulic motor M to each other is constituted of the distribution valve 50, the hydraulic fluid discharged from the hydraulic pump P according to the rotation of the hydraulic pump P is fed through the closed hydraulic circuit to the hydraulic motor M, to drive the hydraulic motor M to rotate, and the hydraulic fluid discharged after driving the hydraulic motor M is returned through the closed hydraulic circuit to the hydraulic pump P.

In this case, since the pump cylinder 22 and the motor cylinder 32 are connected to the transmission output shaft 6 and are rotated as one body with the latter, when the motor cylinder 32 is driven to rotate as above-mentioned, the pump cylinder 22 is also rotated together, and the relative rotating speed of the pump casing 20 and the pump cylinder 22 is reduced. Therefore, the relationship between the rotating speed Ni of the pump casing 20 and the rotating speed No of the transmission output shaft 6 (namely, the rotating speed of the pump cylinder 22 and the motor cylinder 32) is as represented by the following equation (1) in relation to the pump volume Vp and the motor volume Vm.

$$Vp \cdot (Ni - No) = Vm \cdot No \qquad \text{Equation 1}$$

The motor volume Vm can be steplessly varied by a control for pivotally adjusting the motor pivot member 35 by the motor servo mechanism SV. Therefore, when it is assumed that the rotating speed Ni of the pump swash plate member 21 in the above equation (1) is constant, a control for steplessly varying the motor volume Vm causes a speed change control for a stepless speed change of the rotation of the transmission output shaft 6.

When a control for reducing the pivot angle of the motor pivot member 35 is performed, the motor volume Vm is reduced, and, when it is assumed that the pump volume Vp is constant and the rotating speed Ni of the pump swash plate member 21 is constant in the relationship of the above equation (1), there results a control for an increase in speed for causing the rotation of the transmission output shaft 6 to approach the rotating speed Ni of the pump swash plate member 21, i.e., a stepless speed change control to a top speed change stage. At the time when the motor swash plate angle becomes zero, i.e., when the motor swash plate becomes upright, a speed change ratio of Ni=No (top speed change ratio) is theoretically attained, and a hydraulic lock condition results in which the pump casing 20 is rotated as one body with the pump cylinder 22, the motor cylinder 32 and the transmission output shaft 6, to achieve a mechanical power transmission.

Figure 6:
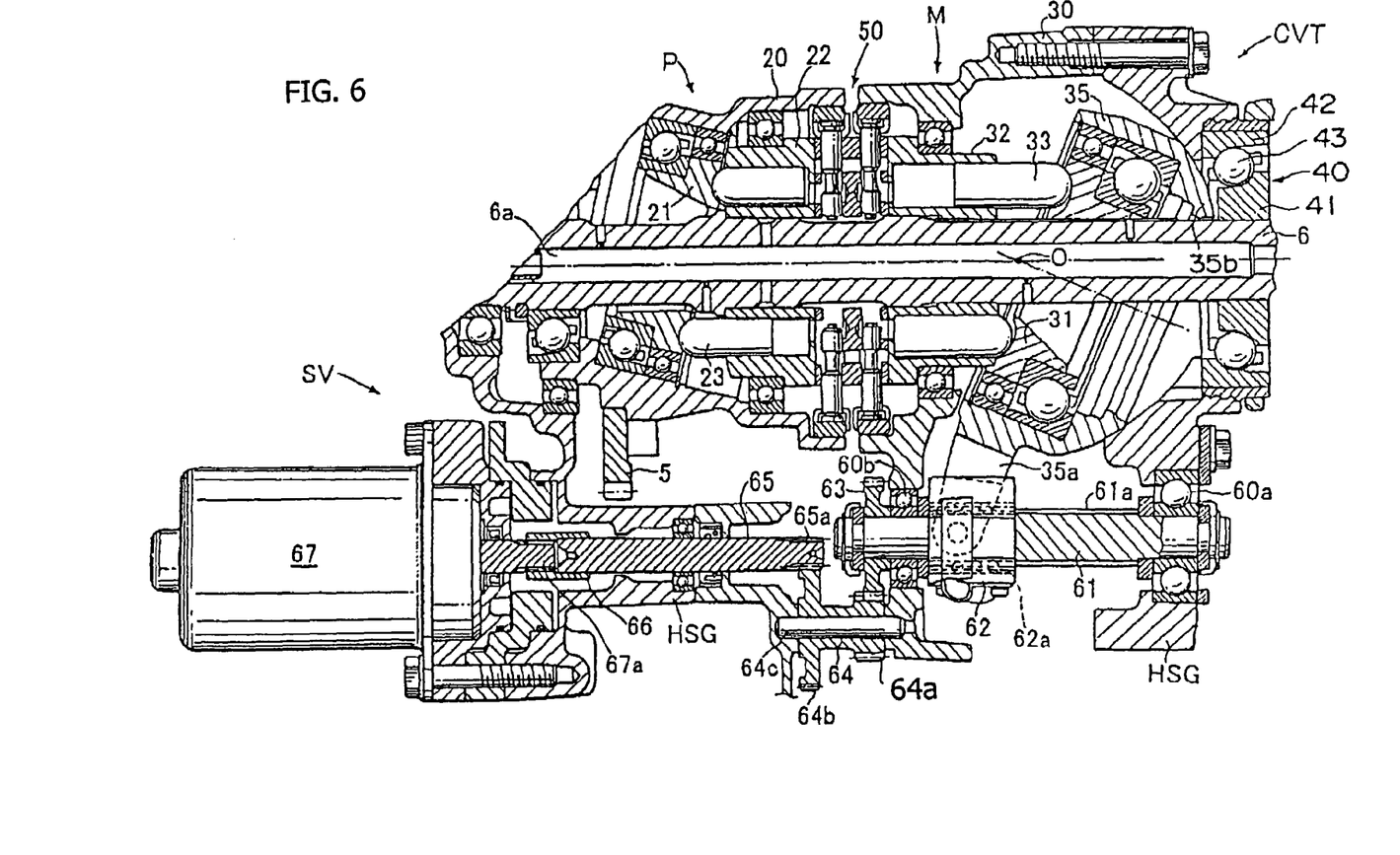
FIG. 6 is a sectional view of the hydraulic continuously variable transmission according to an embodiment of the present invention.

While the control for steplessly varying the motor volume as above-mentioned is performed by a variable control of the motor swash plate angle through pivoting the motor pivot member 35, the motor servo mechanism SV for pivotally adjusting the motor pivot member 35 in this manner will be described below referring principally to FIG. 6.

The motor servo mechanism SV includes a ball screw shaft 61 located in the vicinity of the arm portion 35a of the motor pivot member 35, extending in parallel to the transmission output shaft 6 and supported by bearings 60a and 60b to be rotatable relative to the transmission housing HSG, and a ball nut 62 disposed in screw engagement with a male screw 61a formed at the outer circumference of the ball screw shaft 61. In addition, a ball female screw 62a composed of a multiplicity of balls held arranged in a screw form by a cage is provided at the inner circumference of the ball nut 62, and the male screw 61a is screw-engaged with the ball female screw 62a. The ball nut 62 is connected to the arm portion 35a of the motor pivot member 35, and, when the ball screw shaft 61 is driven to rotate, the ball nut 62 is moved in the left-right direction on the shaft 61, whereby the motor pivot member 35 is pivotally adjusted.

In order to drive the ball screw shaft 61 to rotate in this manner, a swash plate control motor (electric motor) 67 is attached to the outside surface of the transmission housing HSG A drive shaft 67a of the swash plate control motor 67 is connected to a spacer shaft 65 through a coupling 66. The spacer shaft 65 extends inside the transmission housing HSG in parallel to the transmission output shaft 6, extends beyond the outer circumference of the input driven gear 5 to the vicinity of an end portion of the ball screw shaft 61, and is rotatably supported on the transmission housing HSG. On the other hand, an idle shaft 64c extending in parallel to the spacer shaft 65 is supported on the transmission housing HSG, and an idle gear member 64 is rotatably mounted on the idle shaft 64c.

The spacer shaft 65 is provided at its tip end with a first gear 65a, which is meshed with a second gear 64b integrally formed on the idle gear member 64. In addition, a third gear 64a integrally formed on the idle gear member 64 is meshed with a fourth gear 63 mounted in the state of being connected to an end portion of the ball screw shaft 61. Therefore, when a rotational drive control of the swash plate control motor 67 is performed and the drive shaft 67a is thereby rotated, the rotation is transmitted through the idle gear member 64 to the fourth gear member 63, to drive the ball screw shaft 61 to rotate, whereby the ball nut 62 is moved on the shaft 61 in the left-right direction, and the motor pivot member 35 is pivotally adjusted. Thus, the rotation of the swash plate control motor 67 is transmitted through an idle gear train to the screw shaft 61, so that the transmission ratio can be freely varied and set by appropriately setting the gear ratios in the idle gear train.

As clearly seen from the figure, the swash plate control motor 67 is attached to the outside surface of the transmission housing HSG at a position on the left side (the hydraulic pump side) relative to the input driven gear 5. Therefore, the swash plate control motor 67 can be disposed close to the center axis side of the transmission output shaft 6 to such an extent that the swash plate control motor 67 and the input driven gear 5 overlap partly with each other in side view, and it is possible to suppress the width of the hydraulic continuously variable transmission CVT and, hence, the width of the power unit PU. In this case, the spacer shaft 65 which is the smallest in radial size among the components of the motor servo mechanism SV is set to extend through the vicinity of the outer circumferential portion of the input driven gear 5, so that the swash plate control motor 67 can be disposed closest to the center axis side of the transmission output shaft 6.

As has been described above, the power unit PU is disposed in the inside of the saddle portion 82 of the rough terrain vehicle RTV, and the driver is seated on the seat 83 astride the saddle portion 82. Therefore, the problem that the width of the saddle portion 82 is enlarged to make it difficult for the driver to be seated astride the saddle portion 82 can be obviated by suppressing the width of the power unit PU. In addition, since the saddle portion 82 is a space extending in the front-rear direction of the vehicle, there is little restriction as to the size of the power unit PU in the front-rear direction. Therefore, as shown in this embodiment, the swash plate control motor 67 can be disposed on the front side relative to the hydraulic pump P in the state of being connected to the screw shaft through the spacer shaft, whereby the swash plate control motor 67 can be axially spaced to the front side from lateral sides of the hydraulic pump P and the hydraulic motor M, thereby ensuring that the swash plate control motor 67 is less liable to be affected by any heat coming from the side of the hydraulic pump P and the hydraulic motor M.

Meanwhile, when the oil flows through the closed hydraulic circuit and the hydraulic force is transmitted between the hydraulic pump P and the hydraulic motor M as described above, there arise leakage of the oil from the closed hydraulic circuit and leakage of the oil from fitting portions between the pump and motor plunger holes 22a, 32a and the pump and motor plungers 23, 33. In view of this, the transmission output shaft 6 is provided with a charge oil supply hole 6a extending in the axial direction, and, as shown in FIG. 7, the charge oil supply hole 6a is connected to a first check valve CV1 disposed in the pump cylinder 22 through an oil passage 6b formed in the transmission output shaft 6 and an oil passage 51e formed in the pump cylinder 22, and connected further from the first check valve CV1 to the inside passage 56 through an oil passage 51f. Therefore, a charge oil supplied from a charge oil supply source (not shown) into the charge oil supply hole 6a is supplied through the first check valve CV1 into the inside passage 56, as required.

In addition, the charge oil supply hole 6a is connected to a second check valve CV2 disposed in the pump cylinder 22 through an oil passage 6c formed in the transmission output shaft 6 and an oil passage 51g formed in the pump cylinder 22, and is further connected from the second check valve CV2 to the outside passage 57 through an oil passage 51h.

Therefore, the charge oil supplied into the charge oil supply hole 6a is supplied through the second check valve CV2 into the outside passage 57, as required.

As seen from the above description of the operations of the hydraulic pump P and the hydraulic motor M, in a normal running condition, i.e., in the condition where the hydraulic motor M is driven to rotate under the supply of the hydraulic fluid from the hydraulic pump P, a higher pressure is present in the outside passage 57 and a lower pressure is present in the inside passage 56, so that the charge oil is supplied into the inside passage 56 through the first check valve CV1. However, in the condition where the vehicle is running under an engine brake action, a lower pressure is present in the outside passage 57 and a higher pressure is present in the inside passage 56, so that the charge oil is supplied into the outside passage 57 through the second check valve CV2.

Figure 8:
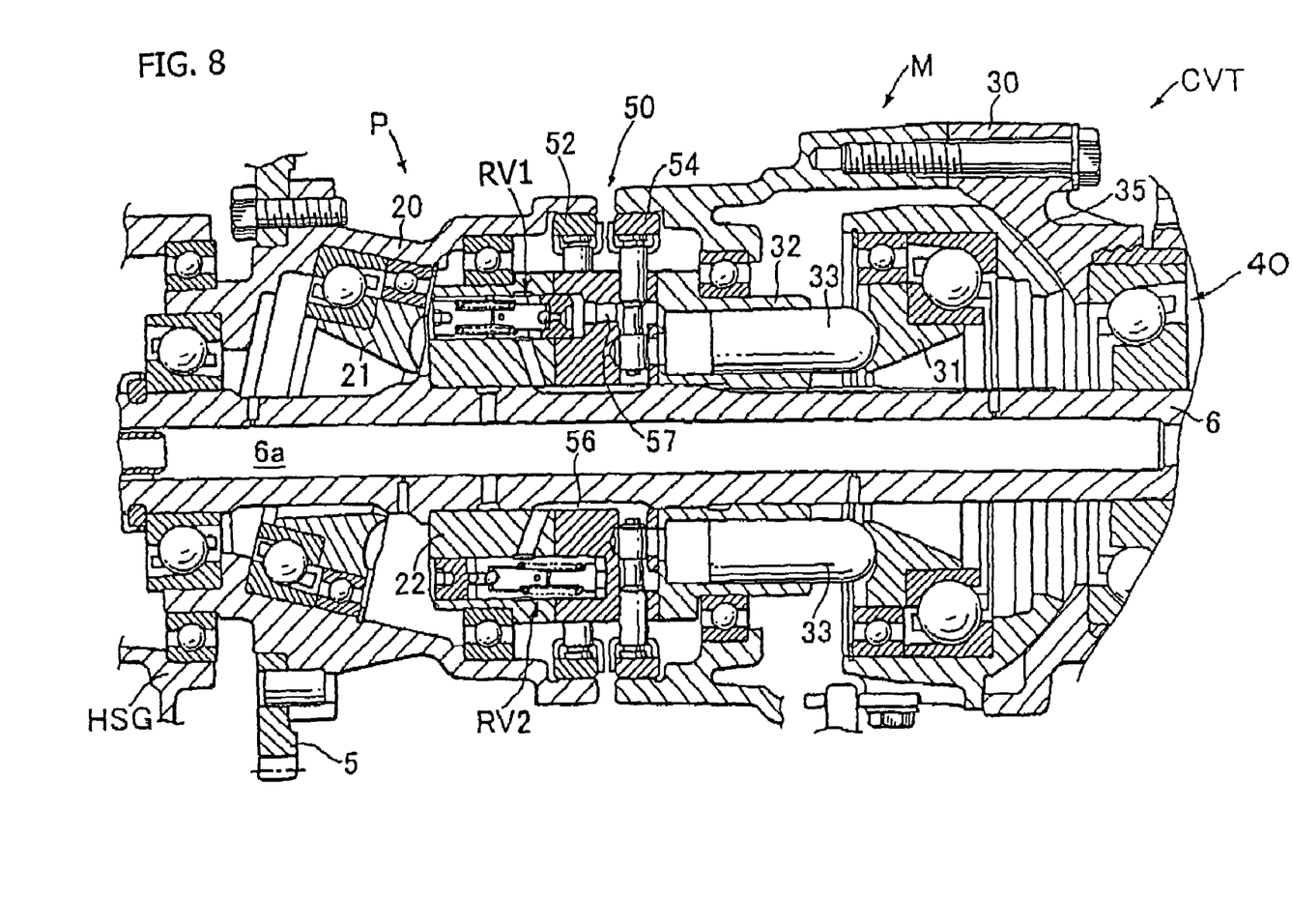
FIG. 8 is a sectional view of the hydraulic continuously variable transmission according to an embodiment of the present invention.

As shown in FIG. 8, first and second relief valves RV1 and RV2 are also disposed in the pump cylinder 22. First, the first relief valve RV1 is disposed in the state of connecting the outside passage 57 and the inside passage 56 to each other, and, when the oil pressure in the outside passage 57 reaches or exceeds a predetermined pressure, the first relief valve RV opens to relieve the oil pressure into the inside passage 56, thereby preventing the oil pressure in the outside passage 57 from becoming excessively high. The second relief valve RV2 is disposed in the state of connecting the inside passage 56 and the outside passage 57 to each other, and, when the oil pressure in the inside passage 56 reaches or exceeds a predetermined pressure, the second relief valve RV2 opens to relieve the oil pressure into the outside passage 57, thereby preventing the oil pressure in the inside passage 56 from becoming excessively high.

As has been described above, according to the present invention, the hydraulic continuously variable transmission includes the input gear provided at the outer circumference of the swash plate plunger pump, the movable swash plate (motor pivot member) constituting the swash plate plunger pump or the swash plate plunger motor and supported to be pivotally movable about a pivot axis extending in a direction perpendicular to the rotational center axis of the input gear, the swash plate adjustment mechanism for pivotally adjusting the movable swash plate, and a servo motor for driving the swash plate adjustment mechanism, wherein the output shaft of the servo motor is disposed in parallel to the rotational center axis of the input gear, and the servo motor and the input gear are disposed close to each other to such an extent that they overlap partly with each other in side view. Therefore, it is possible to reduce the amount of projection of the swash plate adjustment mechanism in the radial direction, and to obtain a compact hydraulic continuously variable transmission with a small width.

In addition, it is preferable that the swash plate adjustment mechanism and the rotatable drive shaft of the servo motor are connected to each other through the spacer shaft being parallel to the rotational center axis of the input gear and extending through the vicinity of an outer circumferential portion of the input gear. With the configuration in which the rotation of the servo motor is thus transmitted to the screw shaft through the spacer shaft, the spacer shaft which is the smallest in radial size can be disposed to pass through the vicinity of the outer circumferential portion of the input gear, the servo motor can be disposed closest to the output shaft side, and the hydraulic continuously variable transmission can be made most compact in width. Furthermore, with the servo motor connected to the swash plate adjustment mechanism through the spacer shaft, the servo motor can be disposed axially away from lateral sides of the pump and the motor, resulting in that the servo motor is less liable to be affected by any heat coming from the side of the pump and the motor.

In addition, it is preferable to provide such a connection that the rotation of the spacer shaft is transmitted to the swash plate adjustment mechanism through the idle gear train. This make it possible, for example, to arbitrarily set the position of the swash plate adjustment mechanism (the screw shaft in the embodiment) and the position of the servo motor, and to increase the degree of freedom in arrangement layout. Furthermore, it is possible to freely set the rotating speed ratio of the swash plate adjustment mechanism (screw shaft) relative to the rotation of the servo motor, i.e., the transmission ratio, by varying the gear ratios in the idle gear train.

Although the present invention has been described herein with respect to a specific illustrative embodiment thereof, the foregoing description is intended to be illustrative, and not restrictive. Those skilled in the art will realize that many modifications of the embodiments could be made which would be operable. All such modifications, which are within the scope of the claims, are intended to be within the scope and spirit of the present invention.

Having thus, described the invention, what is claimed is:

1. A hydraulic continuously variable transmission, comprising:
   a swash plate plunger pump and a swash plate plunger motor connected to each other through a closed hydraulic circuit;
   an input gear operatively connected to said swash plate plunger pump and having a rotational center axis;
   at least one of said swash plate plunger pump and said swash plate plunger motor comprising a pivotally movable swash plate supported to be movable about a pivot axis extending in a direction substantially perpendicular to the rotational center axis of said input gear;
   a swash plate adjustment mechanism for use in pivotally adjusting said pivotally movable swash plate; and
   a servo motor operatively attached to said swash plate adjustment mechanism for adjusting a pivot angle of said pivotally movable swash plate, said servo motor having an output shaft disposed in parallel to the rotational center axis of said input gear;
   wherein the input gear is arranged between a swash plate surface of a pump swash plate member and the servomotor, and said servo motor partially overlaps said input gear in side view.

2. The hydraulic continuously variable transmission of claim 1, wherein said servo motor comprises a rotatable drive shaft, and wherein said swash plate adjustment mechanism is connected to said rotatable drive shaft of said servo motor through a spacer shaft which is parallel to the rotational center axis of said input gear, and which is situated proximate an outer circumferential portion of said input gear.

3. The hydraulic continuously variable transmission of claim 2, wherein said spacer shaft is operatively connected to said swash plate adjustment mechanism through an idle gear train.

4. The hydraulic continuously variable transmission of claim 1, wherein said swash plate plunger motor comprises said pivotally movable swash plate, and further comprising a swash plate support member for supporting said pivotally movable swash plate, and a motor casing for supporting said swash plate support member.

5. The hydraulic continuously variable transmission of claim 4, wherein said motor casing has a concave hemispherical support socket formed therein, and wherein said swash plate support member comprises a motor pivot member supported through sliding contact with said support socket of said motor casing.

6. The hydraulic continuously variable transmission of claim 1, wherein said servo motor is positioned above and adjacent to an outer end of an other one of said swash plate plunger pump and said swash plate plunger motor such that the servo motor does not overlie the swash plate plunger pump and swash plate plunger motor, the servo motor having an output shaft disposed in parallel to the rotational center axis of said input gear.

7. A hydraulic continuously variable transmission, comprising:
 a hollow transmission housing;
 a motor casing disposed within said transmission housing for supporting a motor pivot member;
 the motor pivot member supported by said motor casing;
 a swash plate plunger pump disposed within said housing and comprising a pump swash plate and a pump cylinder;
 an input gear operatively connected to said swash plate plunger pump and having a rotational center axis;
 a swash plate plunger motor rotatably supported on said motor pivot member and comprising a motor swash plate and a motor cylinder; and
 an output shaft extending through and supporting said pump cylinder and said motor cylinder, said output shaft being rotatably supported in said housing through a plurality of rotatable bearings;
 a swash plate adjustment mechanism for use in pivotally adjusting said motor swash plate; and
 a servo motor operatively attached to said swash plate adjustment mechanism for adjusting a pivot angle of said motor swash plate, said servo motor having an output shaft disposed in parallel to the rotational center axis of said input gear, the input gear arranged between a swash plate surface of a pump swash plate member and the servomotor.

8. The hydraulic continuously variable transmission of claim 7, wherein said motor casing has a concave hemispherical support socket formed therein, and wherein said motor pivot member is supported through sliding contact with said support socket of said motor casing.

9. The hydraulic continuously variable transmission of claim 7, wherein said servo motor comprises a rotatable drive shaft, and wherein said swash plate adjustment mechanism is connected to said rotatable drive shaft of said servo motor through a spacer shaft which is parallel to the rotational center axis of said input gear, and which is situated proximate an outer circumferential portion of said input gear.

10. The hydraulic continuously variable transmission of claim 9, wherein said spacer shaft is operatively connected to said swash plate adjustment mechanism via an idle gear train.

11. The hydraulic continuously variable transmission of claim 7, wherein the swash plate adjustment mechanism comprises a threaded shaft which is substantially parallel to said transmission output shaft.

12. The hydraulic continuously variable transmission of claim 7, wherein a servo motor is operatively attached to said swash plate adjustment mechanism for adjusting a pivot angle of said motor swash plate, said servo motor having a rotatable drive shaft disposed in parallel to the rotational center axis of said input gear;
 wherein said swash plate adjustment mechanism is connected to said drive shaft of said servo motor through a spacer shaft, the spacer shaft disposed so as to lie parallel with the rotational center axis of said input gear, co-linearly with the drive shaft of the servo motor, and proximate an outer circumferential portion of said input gear.

13. A hydraulic continuously variable transmission, comprising:
 a hollow transmission housing;
 a motor casing disposed within said transmission housing for supporting a motor pivot member;
 the motor pivot member supported by said motor casing;
 a swash plate plunger pump disposed within said housing and comprising a pump swash plate and a pump cylinder;
 an input gear operatively connected to said swash plate plunger pump and having a rotational center axis;
 a swash plate plunger motor rotatably supported on said motor pivot member and comprising a motor swash plate and a motor cylinder; and
 an output shaft extending through and supporting said pump cylinder and said motor cylinder, said output shaft being rotatably supported in said housing through a plurality of rotatable bearings;
 a swash plate adjustment mechanism for use in pivotally adjusting said motor swash plate; and
 a servo motor operatively attached to said swash plate adjustment mechanism for adjusting a pivot angle of said motor swash plate, said servo motor having a rotatable drive shaft disposed in parallel to the rotational center axis of said input gear,
 wherein said swash plate adjustment mechanism is connected to said drive shaft of said servo motor through a spacer shaft, the spacer shaft disposed so as to lie parallel with the rotational center axis of said input gear, co-linearly with the drive shaft of the servo motor, and proximate an outer circumferential portion of said input gear.

* * * * *